United States Patent
Roberts, Sr. et al.

[11] Patent Number: 5,834,553
[45] Date of Patent: Nov. 10, 1998

[54] POLYMERIC COMPOSITION FOR DAMPROOFING WALLS

[76] Inventors: Michael G. Roberts, Sr., 682 Springwater Dr., Akron, Ohio 44333; Michael G. Roberts, Jr., 1512 Treasch Dr., Cuyahoga Falls, Ohio 44221

[21] Appl. No.: 833,808

[22] Filed: Apr. 9, 1997

[51] Int. Cl.$^6$ ..................................... C08L 25/00
[52] U.S. Cl. ..................... 524/577; 523/177; 524/506; 524/356; 106/2; 106/33; 106/285; 106/472
[58] Field of Search .............................. 523/177; 524/577, 524/506, 356; 106/2, 33, 285, 472

[56] References Cited

U.S. PATENT DOCUMENTS

| | | |
|---|---|---|
| 3,914,197 | 10/1975 | Schoenholz et al. ............... 260/28.5 A |
| 5,028,487 | 7/1991 | Kindt et al. ............... 428/489 |
| 5,145,748 | 9/1992 | Gaidis et al. ............... 428/489 |
| 5,324,768 | 6/1994 | Walmsley ............... 524/494 |
| 5,597,409 | 1/1997 | Ito et al. ............... 106/671 |

*Primary Examiner*—Melvyn I. Marquis
*Attorney, Agent, or Firm*—Renner, Kenner, Greive, Bobak, Taylor & Weber

[57] ABSTRACT

A dampproofing composition comprising from about 25 to about 80 parts by weight of a polymer based component, from about 15 to about 70 parts by weight of a solvent, and from about 5 to about 60 parts by weight of a processing oil, to total about 100 parts by weight, wherein the solvent produces a substantially homogeneous solution.

22 Claims, 1 Drawing Sheet

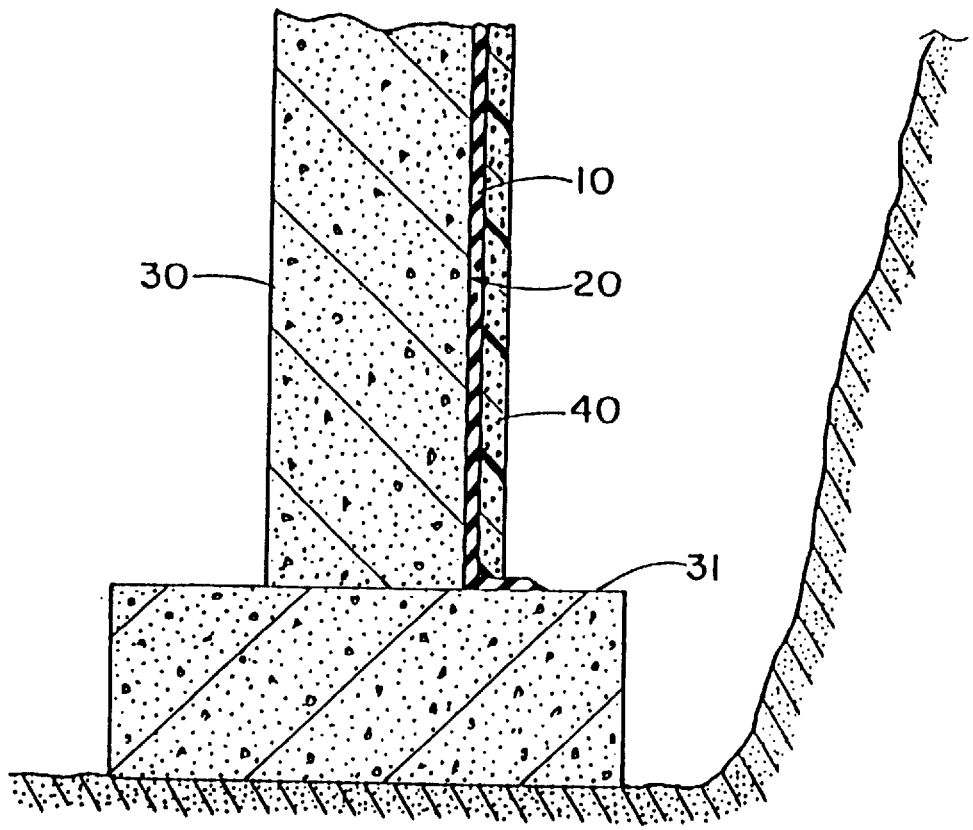

POLYMERIC COMPOSITION FOR DAMPROOFING WALLS

TECHNICAL FIELD

This invention relates to a dampproofing composition. Particularly, the present invention relates to a dampproofing composition having improved physical properties over known dampproofing compositions as well as many environmental benefits. Specifically, the present dampproofing composition is polymer based and preferably incorporates therein polymeric compositions that are otherwise waste streams.

BACKGROUND OF THE INVENTION

Dampproofing compositions are well known in the art, and are best defined with reference to waterproofing compositions. The criteria defining a waterproofing composition have been standardized by BOCA Evaluation Services, Inc. of Country Club Hills, Ill. Namely, waterproofing compositions are those that are resistant to water solubility, as defined in ASTM D2939; resistant to waterflow as defined in ASTM D466; exhibit adequate tensile properties as defined in ASTM D412; resist hydrostatic pressure over non-structural cracks as defined in TT-C-555B; and have the ability to bridge cracks at 0° F. according to ASTM C836.

Those of skill in the art appreciate that damp proofing compositions are those that are resistant to waterflow, but do not exhibit the ability to resist hydrostatic pressure over non-structural cracks and to bridge cracks at 0° F. Further, dampproofing composition known heretofore in the art do not exhibit the same resistance to water solubility as do waterproofing compositions.

As is well known in the art, dampproofing compositions are much less expensive than waterproofing compositions. In most applications, if cost were not a consideration, waterproofing compositions would be employed. Typically, where a basement or the like is constructed in a very wet area where hydrostatic water pressure is expected, waterproofing compositions are employed. They are also employed where building regulations or architectural demands call for such a composition. In most other situations, it is simply the practice in the art to employ a dampproofing composition.

Because dampproofing compositions are employed in those situations where fewer performance specifications need to be met, users of such materials demand a very inexpensive product, and thus cost becomes a major consideration when making the dampproofing compound. Heretofore in the art, dampproofing compounds were asphalt based, with some including small amounts of synthetic polymer. Typically, the synthetic polymer additives comprised of less than about ten percent of the entire composition.

Dampproofing compositions are typically applied to a surface by spraying the composition or by simply rolling the composition on the surface. Accordingly, the asphalt compositions are typically reduced in organic solvents or emulsified using various emulsifying agents.

It has recently been observed that coatings resulting from asphalt compositions leach from the surface. This is believed to result from the many polar chemical species present within asphalt. In fact, excavations of asphalt treated foundations show that it is not uncommon for most of the asphalt coating to have leached from the surface of the wall within about three years. Moreover, substantial leaching has been observed within a few months of applying the coating composition.

Further problems associated with dampproofing compositions known heretofore in the art are caused by the slow dry or cure rate of the coating compositions. This slow cure rate results from the solvents employed, which are typically chosen because of cost considerations. The inexpensive solvent systems employed heretofore in the art have included diesel fuel, kerosene, and mineral spirits.

A slow cure rate is problematic because the uncured dampproofing coatings are very soft and lack toughness. Because it is very common for foundational excavations to be backfilled within a day or two of coating the foundation, damage results to the uncured coating. When an emulsion based dampproofing composition is employed, the cure time is typically unacceptable in colder climates where the evaporation rate of the water is greatly reduced. Moreover, when not fully cured, the emulsion based coatings can be washed from the surface by rain.

In addition to the inferior coatings resulting from dampproofing compositions known heretofore in the art, the known dampproofing compositions have presented many environmental hazards. For example, leaching of the asphalt coatings can contaminate soil and ground water, as well as clog sump and drain tile systems.

Thus, there exists a need for a dampproofing composition that is cost competitive with known dampproofing compounds and yet does not exhibit the undesirable characteristics discussed above.

SUMMARY OF INVENTION

It is therefore, an object of the present invention to provide a dampproofing composition.

It is another object of the present invention to provide a dampproofing composition that is cost competitive with known dampproofing compositions.

It is yet another object of the present invention to provide a dampproofing coating that has improved physical properties over known dampproofing coatings.

It is a still another object of the present invention to provide a dampproofing coating that does not need to be heated to be applied and that can be readily applied over a large temperature range.

It is yet another object of the present invention to provide a dampproofing composition that has superior adhesion properties to both known dampproofing and waterproofing compositions.

It is still another object to provide a dampproofing coating that will not leach from the surface.

It is yet another object to provide a dampproofing composition having improved cure time as compared to known dampproofing compositions.

It is still another object to provide a dampproofing coating that has elastic properties and the ability, at ambient temperatures, to bridge hairline cracks.

It is yet another object to provide a dampproofing composition that is uneffected by rainfall within thirty minutes of its application to a surface.

At least one or more of the foregoing objects, together with the advantages thereof over the known art relating to dampproofing compositions and coatings, which shall become apparent from the specification which follows, are accomplished by the invention as hereinafter described and claimed In general the present invention provides a dampproofing composition comprising from about 25 to about 80 parts by weight of a polymer based component, from about 15 to about 70 parts by weight of a solvent, and from about 5 to about 60 parts by weight of a processing oil, to total about 100 parts by weight, wherein the solvent produces a substantially homogeneous solution.

The present invention further provides a wall having an interior surface and an exterior surface comprising a continuous coating disposed on at least one of the surfaces, and being introduced onto the wall by applying to at least one of the surfaces a composition of matter comprising from about 25 to about 80 parts by weight of a polymer based component, from about 15 to about 70 parts by weight of a solvent, and from about 5 to about 60 parts by weight of a processing oil, to total about 100 parts by weight.

The present invention also includes a method of precoating a wall prior to waterproofing the wall comprising the step of spraying the wall with the dampproofing composition comprising from about 25 to about 80 parts by weight of a polymer based component wherein the polymer-based component comprises from about 60 to about 98 parts by weight of a polymer, and from about 2 to about 40 parts by weight of a filler to total about 100 parts by weight, from about 15 to about 70 parts by weight of a solvent, and from about 5 to about 60 parts by weight of a processing oil, to total about 100 parts by weight wherein the solvent produces a substantially homogeneous solution prior to applying a waterproofing composition to the wall.

BRIEF DESCRIPTION OF THE DRAWING

The FIGURE is a vertical, cross-sectional partial view of a wall having a dampproofing coating thereon.

PREFERRED EMBODIMENT FOR CARRYING OUT THE INVENTION

The present invention is generally directed toward a polymeric dampproofing composition The composition is reduced in a solvent and applied, preferably by spraying, to a surface. Upon drying or curing, the composition forms a dampproofing coating on the applied surface.

Specifically, the dampproofing composition of the present invention includes from about 25 to about 80 parts by weight of a polymer based component, from about 15 to about 70 parts by weight of a solvent, and from about 5 to about 60 parts by weight of a processing oil, to total 100 parts by weight. Preferably, the composition comprises from about 30 to about 65 parts by weight of the polymer based component, from about 25 to about 60 parts by weight of the solvent, and from about 10 to about 45 parts by weight of the processing oil, to total 100 parts by weight.

With particular regard to the polymer based component, included therein is about 60 to about 98 parts by weight of a polymer, and from about 2 to about 40 parts by weight of a filler, to total 100 parts by weight. Preferably, the polymer based component includes from about 75 to about 97 parts by weight polymer, and from about 3 to about 25 parts by weight filler, to total 100 parts by weight.

The polymer can include any polymer, including polystyrene, styrene based random copolymers and styrene based block copolymers, so long as the polymer selected is soluble in one or more of the solvent systems discussed hereinbelow. Such polymers should preferably have an average molecular weight in the range from about 50,000 to about 350,000, and preferably from about 75,000 to about 175,000. Preferably, the polymer should be in the form of pellets or a powder, although any form will work given proper mixing and masticating. When a preferred powder or pellet is employed, the particle size of the polymer should be less than about $200\mu$, preferably less than about $100\mu$, and most preferably less than about $50\mu$.

The filler can include any organic or inorganic filler that will not deleteriously impact the dampproofing composition or the resulting coating. Further, the filler should not include one that will readily leach from the surface, or one that will have an adverse impact on the environment. Preferred fillers include carbon black Magnetite can also be employed. As with the polymer, the filler should be in the form of a pellet or powder and therefore should have particle sizes no greater than that of the polymer component.

In one preferred embodiment, it has been found particularly useful to employ waste or spent copy toner for use as the polymer component. Although the constituents within copy toner may vary from manufacturer to manufacturer, it is believed that a majority of the copy toners available comprise the constituents identified above, and therefore it is believed that copy toner falls within the general description of the polymer component. Waste copy toner is readily available and abundant. Moreover, the use of waste copy toner as the polymer component of the present invention provides a method for recycling such waste copy toner.

Waste copy toner that is useful in the present invention can be obtained from Prism Environmental, Inc., of Baltimore Maryland. Although most waste streams of copy toner are useful, unexpectedly good results have been obtained when employing waste copy toner streams that have little or no magnetite. Accordingly, not all waste streams of copy toner are preferred. It has been found that some waste streams having magnetite therein tend to coagulate in the preferred solvents of the present invention. In those situations, magnetic filtration of these waste streams may be required. As those of skill in the art will appreciate, waste streams rich in magnetite are distinguished from those highly preferred waste streams having carbon black therein based on weight.

It is also contemplated that other waste streams of polymeric material can be employed in the present invention. For example, recycled polystyrene powder is available from most plastic or rubber recyclers. Waste streams of styrene based copolymers is also a viable option. The appropriate fillers are combined with these polymeric waste streams to form the polymer based component of the present invention. Carbon black being a preferred filler.

A wide variety of solvents can be employed in the composition of the present invention so long as the solvent produces a homogeneous solution and/or dispersion. Furthermore, the solvent system should produce a composition having a density between about 7.0 and about 8.2 lbs/gallon, and preferably between about 7.5 and about 7.9 lbs/gallon.

Preferred are hydrocarbon solvents such as heptane, cyclohexane, toluene, mineral spirits, xylene, acetone and naphthenic distillates. Preferred among the naphthenic distillates are those sold under the trade names LACTOL SPIRITS and Superlactol Spirits by Unocal, and that sold under the trade name LACOLENE by Ashland.

Preferred solvent systems include those comprising about 100% acetone, or about 100% naphthenic distillates, or a blend of about 2 parts by weight heptane and about 1 part by weight toluene. Most preferred are those comprising 100% acetone or 100% naphthenic distillates.

The processing oil employed is preferably an aromatic or naphthenic processing oil. Such processing oils are typically non-leaching. In fact, the aromatic processing oils are highly preferred. It has surprisingly been found that the combination of aromatic processing oil together with the preferred solvents of the present invention have resulted in a dampproofing coating that is superior in terms of strength, elongation and recovery as compared to other dampproofing coatings having other processing oils. Moreover, it has surprisingly been found that the coatings improve with those processing oils having a greater aromaticity. Table I below provides characteristic data for this preferred aromatic processing oils.

TABLE I

| | Preferred | More Preferred | VIPLEX ™ 885 | VIPLEX ™ 525 | SHELLFLEX ® 371 | SHELLFLEX ® 3681 |
|---|---|---|---|---|---|---|
| Aromatics % | >75 | >90 | 95.5 | 98 | 10 | 37.4 |
| Aniline Point, °F. | <100 | <80 | 74–76 | 74–76 | 215 | 207 |
| Flash Point, °F. | 300–400 | 350–400 | 365 | 385 | 420 | 440 |
| Boiling Point, °F. | >450 | >500 | >640 | >500 | <500 | <500 |

As should be readily apparent, the preferred processing oils are very high in aromatic content and have a relatively low aniline point. This is especially true in view of the less preferred processing oils sold under the tradename SHELL-FLEX®.

Processing oils useful in the present invention are commercially available, for example, from the Shell Chemical Company under the trade name SHELLFLEX® 371, which is a heavy naphthenic distillate solvent that has been refined, hydrotreated, and acid treated. Also available is that sold by Crowley Chemical Company under the trade name VIPLEX™ 110, VIPLEX™ 525, and VIPLEX™ 885. It should be understood that the VIPLEX products are aromatic processing oils. VIPLEX™ 525 and VIPLEX™ 885 are higher in aromaticity and are therefore highly preferred.

It should be further appreciated that the dampproofing composition of the present invention may also include various additives known in the art such as inorganic fillers, aluminum paste, and small amounts of other polymers.

As discussed above, the compositions of the present invention are applied to a surface to form a coating thereon. It should be understood that these surfaces generally include concrete, masonry, gypsum board and wood. In most situations, a dampproofing composition is applied to a concrete or masonry subsurface wall. The use of the composition of the present invention, however, should not be limited thereto inasmuch as the composition can be applied to above surface walls to form a vapor barrier thereon. Because as the composition of the present invention has superior adhesion properties, as will be discussed in the examples hereinbelow, it has been found useful to use the composition of the present invention as a pre-coat to waterproofing a wall. In other words, the composition of the present invention has superior adhesion properties over that of waterproofing and will adhere to many surfaces that waterproofing compositions will not adhere to. The dampproofing composition is therefore applied to such surfaces to form a dampproofing coating and a waterproofing composition can then be applied over the dampproofing coating to form a waterproofing coating thereon. As a result of the very inexpensive cost, especially in the situation where recycled copy toner is employed, the use of a pre-coat dampproofing coating is commercially viable. Other uses include use as a primer for metal or metal coated surfaces and use as a substitute for roofing felt, especially on manufactured housing.

With regard to applying the compositions of the present invention, typically the compositions are sprayed on to a surface using an airless sprayer such as that sold by GRACO. Such an apparatus generates between about 1000 and about 2000 psi to effectively spray the composition of the present invention. Other means of applying the composition include rolling and/or brushing.

With specific regard to the application using an airless sprayer, application rates from about 90 to about 200 square feet per gallon were attainable. It should be appreciated that the applicator's application technique could cause the application rate to vary. Preferably, an application rate of about 100 to about 160 square feet per gallon is desired. Even better application rates have been obtained on poured concrete walls.

When forming a dampproofing coating pursuant to a method of the present invention, a dampproofing composition is applied to a surface using a means for applying such composition as discussed above. Generally, a layer of the composition is applied to the surface; the layer being from about 3 mils to about 20 mils thick, and preferably from about 5 mils to about 16 mils thick.

EXPERIMENTAL

In order to demonstrate the practice of the present invention, the following dampproofing compositions were made, applied to a surface, and allowed to dry to form a dampproofing coating. The examples set forth hereinbelow, however, are not to be viewed as limiting the disclosure. The claims will serve to define the scope of the invention.

Specifically, five dampproofing compositions accordingly to the present invention were prepared. The recipe for each composition is listed in Table II.

TABLE II

Dampproofing Composition Constituent Concentration (Parts by Weight)

| | Compositions | | | | |
|---|---|---|---|---|---|
| Constituent | A | B | C | D | E |
| SPENT COPY TONER[a] | 34 | 34 | 38 | 49 | 30 |
| Viplex 885 | 33 | — | — | — | 5 |
| Viplex 525 | — | 33 | 12 | 13 | 5 |
| Shell-Flex 371 | — | — | 12 | — | — |
| Super Lactol Spirits | — | 22 | 38 | — | — |
| Toluene | 10 | — | — | 13 | — |
| Heptane | — | 11 | — | 25 | — |
| Acetone | — | — | — | — | 60 |
| Lactol Spirits | 23 | — | — | — | — |

[a]Prism Environmental, Inc.

All of the recipes were mixed using a high speed mixer for about one hour. Compositions A and D were sprayed on both a concrete wall and a gypsum board using a GRACO 30:1 airless sprayer at 1500 psi. A spray tip orifice of 0.027 inches was employed for both compositions. The environmental temperature was 54° F. and raining Surprisingly, a uniform coating was obtained using each composition on the gypsum board. The coating had excellent hiding power and was essentially free of any bubbles or runs. Both compositions were also sprayed on wet concrete, and similar results were obtained. Likewise, both compositions were sprayed onto a concrete surface that was protected from the rain. The results obtained on both wet and dry concrete surfaces were very similar. The ability of either composition to adhere and form a coating on the wet wall was clearly unexpected.

Composition E was sprayed on a masonry block wall using a GRACO 30:1 airless sprayer at 1500 psi employing a spray tip orifice of 0.025 inches. The environmental temperature was 20° F. and the wall was visibly frosted. Despite the environmental temperature, the sprayability of the composition was unaffected, as was the coating that was produced. The adhesion of the composition to the wall was unaffected despite the frost.

Each of the samples were subjected to leach testing and compared with a standard asphalt dampproofing. Specifically, RC-70, a standard generic asphalt dampproofing available from most contracting supply houses, was employed. Each of these samples were brush applied to small concrete specimens and allowed to complete the cure period. All cured specimens were then placed in beakers of distilled water at 200° F. After a period of four hours, those beakers containing specimens of the coatings of the present composition showed no visible indication that the coating had leached. On the other hand, the beaker containing the RC-70 coating specimen changed in color appreciably to a murky brown. Moreover, it was observed that the concrete specimen having the control coating thereon had substantially leached from the specimen and into the water.

It should be further understood that compositions A–E varied in viscosity as a result of the various solvent systems used. Table II below includes the results of viscosity testing done at 20° and 70° F.

TABLE II

Viscosity Measurements (cps)

| Composition | Viscosity at 20° F. | Viscosity at 70° F. |
|---|---|---|
| A | 4600 | 575 |
| B | 6950 | 680 |
| C | 5400 | 620 |
| D | 7200 | 605 |
| E | 620 | 610 |

The solvent system employed in Composition E provided a relatively flat viscosity curve between the temperatures in question. This result was unexpected, and is highly desirable inasmuch as a thin coating could be achieved throughout a large temperature range.

Thus, it should be evident that the compositions and coatings of the present invention are greatly improved over known dampproofing compositions, and are cost competitive with known dampproofing compositions.

Based upon the foregoing disclosure, it should now be apparent that the use of the dampproofing compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, other solvents and processing oils can be employed. Thus, the scope of the invention shall include all modifications and variations that may fall within the scope of the attached claims.

What is claimed is:

1. A dampproofing composition comprising:
   from about 25 to about 80 parts by weight of a polymer based component;
   from about 15 to about 70 parts by weight of a solvent; and
   from about 5 to about 60 parts by weight of a processing oil, to total about 100 parts by weight;
   wherein the solvent produces a homogeneous solution.

2. A dampproofing composition as set forth in claim 1, wherein the polymer-based component comprises from about 60 to about 98 parts by weight of a polymer selected from the group consisting of polystyrene, styrene based random copolymers, and styrene based block copolymers, and from about 2 to about 40 parts by weight of a filler to total about 100 parts by weight.

3. A dampproofing composition as set forth in claim 2, wherein said polymer comprises polystyrene.

4. A dampproofing composition as set forth in claim 2, wherein said filler comprises carbon black.

5. A dampproofing composition as set forth in claim 1, wherein said polymer based component comprises spent copy toner.

6. A dampproofing composition as set forth in claim 1, wherein the solvent comprises acetone.

7. A dampproofing composition as set forth in claim 1, wherein said processing oil is an aromatic processing oil.

8. A dampproofing composition as set forth in claim 1, wherein said solvent provides the dampproofing composition with a relatively flat viscosity curve between about 20° F. and about 70° F.

9. A method of recycling spent copy toner comprising the step of adding spent copy toner to the dampproofing composition of claim 1.

10. A method of pre-coating a wall prior to waterproofing the wall comprising the step of spraying the wall with the dampproofing composition of claim 1 prior to applying a waterproofing composition to the wall.

11. A wall having an interior surface and an exterior surface comprising:
    a continuous coating disposed on at least one of the surfaces, and being introduced onto the wall by applying to at least one of the surfaces a composition of matter comprising:
    from about 25 to about 80 parts by weight of a polymer based component;
    from about 15 to about 70 parts by weight of a solvent; and
    from about 5 to about 60 parts by weight of a processing oil, to total about 100 parts by weight.

12. A wall as set forth in claim 11, wherein the polymer-based component comprises from about 60 to about 98 parts by weight of a polymer selected from the group consisting of polystyrene, styrene based random copolymers, and styrene based block copolymers, and from about 2 to about 40 parts by weight of a filler to total about 100 parts by weight.

13. A wall as set forth in claim 12, wherein said polymer comprises polystyrene.

14. A wall as set forth in claims 12, wherein said filler comprises carbon black.

15. A wall as set forth in claim 11, wherein said polymer based component comprises spent copy toner.

16. A method of pre-coating a wall prior to waterproofing the wall comprising the step of spraying the wall with the dampproofing composition comprising:

from about 25 to about 80 parts by weight of a polymer based component;

wherein the polymer-based component comprises from about 60 to about 98 parts by weight of a polymer, and from about 2 to about 40 parts by weight of a filler to total about 100 parts by weight, said polymer being selected from the group consisting of polystyrene, styrene based random copolymers, and styrene based block copolymers,;

from about 15 to about 70 parts by weight of a solvent; and from about 5 to about 60 parts by weight of a processing oil, to total about 100 parts by weight;

wherein the solvent produces a substantially homogeneous solution prior to applying a waterproofing composition to the wall.

17. A dampproofing composition as set forth in claim 16, wherein the solvent comprises acetone.

18. A dampproofing composition as set forth in claim 16, wherein said processing oil is an aromatic processing oil.

19. A dampproofing composition as set forth in claim 1, wherein the composition comprises:

from about 25 to about 60 parts by weight of the polymer based component;

from about 25 to about 60 parts by weight of the solvent; and from about 10 to about 45 parts by weight of the processing oil, to total about 100 parts by weight.

20. A dampproofing composition as set forth in claim 7, wherein said processing oil has greater than 90 percent aromatics.

21. A method of pre-coating a wall, as set forth in claim 16, wherein the solvent comprises acetone.

22. A method of pre-coating a wall as set forth in claim 16, wherein said processing oil is an aromatic processing oil.

* * * * *